(12) United States Patent
Sun (10) Patent No.: US 6,448,720 B1
(45) Date of Patent: Sep. 10, 2002

(54) CIRCUIT FOR DRIVING AN HID LAMP

(75) Inventor: Yiyoung Sun, Beverly, MA (US)

(73) Assignee: Matsushita Electric Works R&D Laboratory, Inc., Woburn, MA (US)

( * ) Notice: Subject to any disclaimer, the term of this patent is extended or adjusted under 35 U.S.C. 154(b) by 0 days.

(21) Appl. No.: 09/820,712

(22) Filed: Mar. 30, 2001

(51) Int. Cl.[7] .............................................. H05B 37/02
(52) U.S. Cl. ...................... 315/219; 315/243; 315/244; 315/245
(58) Field of Search ................................. 315/224, 219, 315/241 R, 242, 243, 244, 245

(56) References Cited

U.S. PATENT DOCUMENTS

| | | |
|---|---|---|
| 4,912,374 A | 3/1990 | Nagase et al. |
| 5,483,125 A * | 1/1996 | Kachmarik et al. ......... 315/106 |
| 6,020,691 A | 2/2000 | Sun et al. |
| 6,144,172 A | 11/2000 | Sun |

* cited by examiner

*Primary Examiner*—David Vu
(74) *Attorney, Agent, or Firm*—Greenblum & Bernstein, P.L.C.

(57) ABSTRACT

A circuit arrangement and control thereof for igniting a high intensity discharge (HID) lamp, for reducing the variation of the resonant ignition voltage under the parasitic capacitive loading condition, and for increased circuit stability. The high frequency ignition voltage is only applied to the lamp during an ignition phase. The variation of the magnitude of the resonant ignition voltage with respect to the parasitic capacitance at the lamp leads is minimized by inserting a damping resistor in series with the ignition resonant capacitor. In a normal operation after ignition, the charge and/or discharge current of the ignition resonant capacitor is bypassed through a bypass device instead of flowing through a current sense resistor, so that only a chopper current flows through a sensor by paralleling a relatively high impedance resistor with the sensor.

40 Claims, 8 Drawing Sheets

CIRCUIT FOR DRIVING AN HID LAMP

BACKGROUND OF THE INVENTION

1. Field of the Invention

The present invention pertains to an apparatus and method for driving a high intensity discharge (HID) lamp. Specifically, the present invention is directed to generating a high frequency resonant ignition voltage to ignite (start) the HID lamp, and to maintain a stable circuit operation with minimal interference from a high frequency resonant ignition circuit to a peak current sense signal that is used for output power and current control during a normal state of operation. A variation of the magnitude of the resonant ignition voltage with respect to a parasitic capacitance related to a length of the lamp leads is minimized by the inclusion of a damping resistor connected in series with a resonant ignition capacitor.

2. Discussion of Background and Relevant Information

Electronic high intensity discharge lamps generally employ one of two techniques for igniting (starting) the lamp. In a first technique, the lamp is ignited using a pulsed ignition method. In a second technique, the lamp is ignited using a resonant ignition method. The peak magnitude of the ignition voltage associated with the resonant ignition method is lower than the peak magnitude of the ignition voltage associated with the pulse ignition method. Accordingly, from the standpoint of safety, the resonant ignition method is generally preferred over the pulsed ignition method.

Further, two distinctively different methods exist to continue operating the lamp after it has been ignited. In a first method, the lamp is operated with a high frequency signal that is typically in the kilo Hertz (kHz) range. In a second method, the lamp is operated with a low frequency signal that is typically measured in the hundreds of Hertz range. Due to acoustic resonance problems associated with high frequency operations, it is generally preferred to employ the low frequency operation method to maintain the operation (e.g., illumination) of the lamp.

Figure 3A:
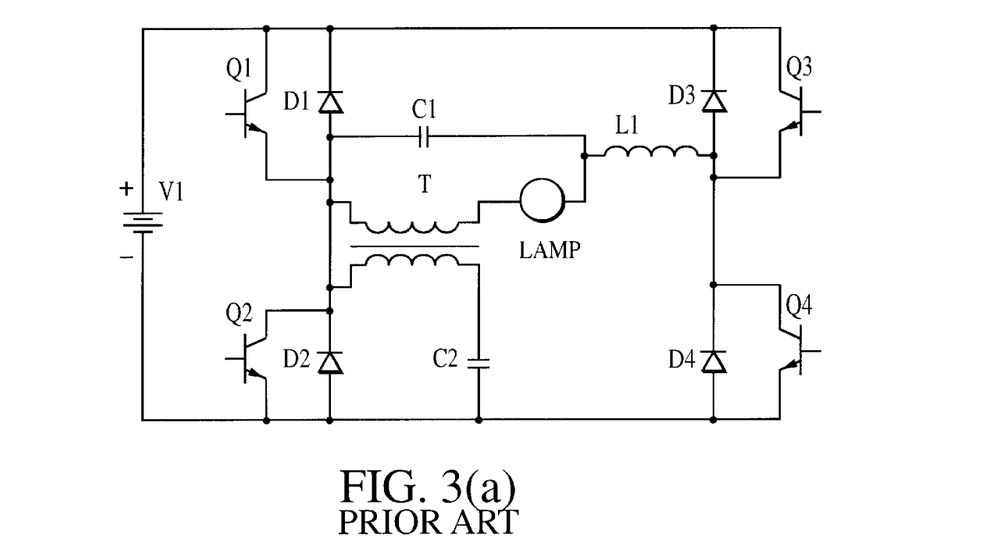
FIG. 3(a) illustrates a prior art block diagram of an output network having an ignition resonant network that is separated from a buck resonant network.
Figure 3B:
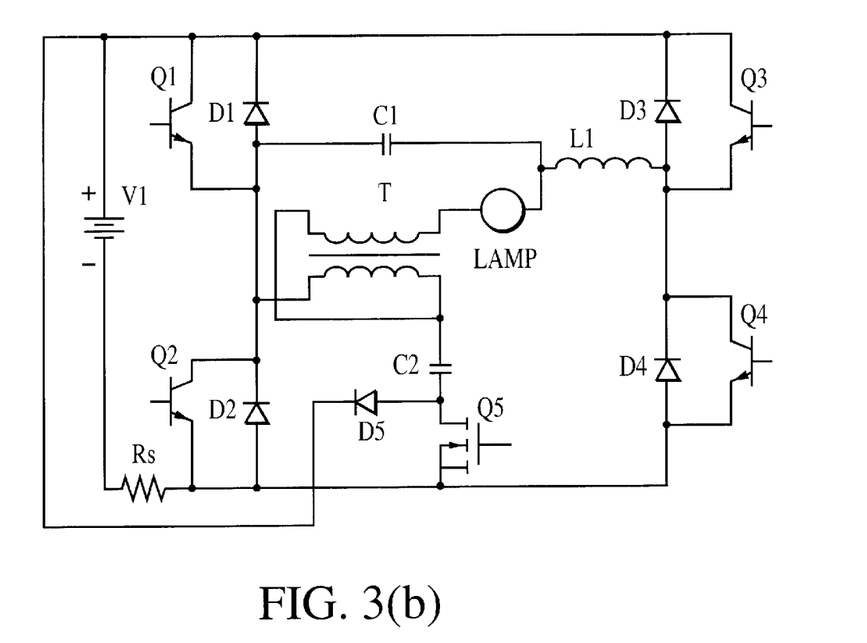
FIG. 3(b) illustrates a modification of the circuit of FIG. 3(a), in which the ignition resonant network is separated from the buck resonant network, with the ignition capacitor being switched OFF after the lamp is ignited.
Figure 3C:
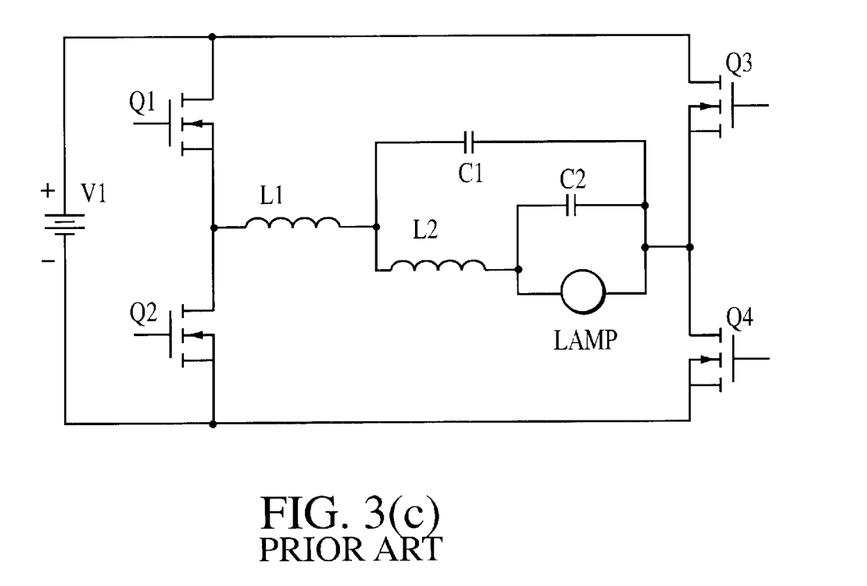
FIG. 3(c) illustrates a prior art two stage LC output filter.

In order to generate a high frequency voltage having sufficient energy to ignite the lamp or to run the lamp (after ignition) with a high frequency signal, three fundamental approaches are generally taken, as shown in FIGS. 3(a) to 3(c).

FIG. 3(a) illustrates a discharge lamp driving circuit having a chopper and a high frequency inverter. Depending upon different control schemes applied to switches Q1 to Q4, this configuration can serve many design purposes.

It is known that HID lamps exhibit an acoustic resonance when operated at a high frequency. U.S. Pat. No. 4,912,374 discloses a method to interrupt the high frequency current with a smoothed DC current. Inductor L1 and capacitor C1 form a buck resonant network. Transformer T and capacitor C2 form an inverting resonant circuit. When transistor pair Q1 and Q4 and transistor pair Q2 and Q3 are alternately switched at a high frequency, two high frequency AC currents flow through the lamp. The first high frequency AC current is produced by the buck resonant network. The second high frequency AC current is produced by the inverting resonant network. As a result, a loop current is formed between the capacitor C1, the transformer T, and the lamp. When transistor Q4 is switched at a high frequency, transistor Q1 is ON, and transistors Q2 and Q3 are completely OFF (due to the chopper, or buck, configuration.), so that a DC current flows from left to right through the lamp. When transistor Q3 is switched at a high frequency, transistor Q2 is ON, and transistors Q1 and Q4 are completely OFF, so that a DC current flows from right to left through the lamp.

To control the DC current, some sort of buck current sensing is required. Such a system is not disclosed in detail in U.S. Pat. No. 4,912,374. The simplest method to sense the buck current is to add a sense resistor in series with input bus voltage V1. However, unless special care is taken to separate the inverting resonant network current from the buck network current, a coupling may occur between the inverting resonant network and the buck resonant network. U.S. Pat. No 4,912,374 does not disclose the separation of the inverting high frequency operation and the buck DC or low frequency operation, but the inverting high frequency operation is utilized just for starting (igniting) the lamp and the DC (or low frequency) operation is utilized for the normal (continuous) operation of the lamp after it has been started.

FIG. 3(b) illustrates a modification of U.S. Pat. No. 4,912,374, in which MOSFET Q5 and diode D5 are added. The inclusion of these components results in the lamp current comprising a clean square wave, while the sensed buck current comprises a clean triangular wave. It is noted that MOSFET Q5 can be switched OFF any time after the lamp is ignited (started), or whenever the high frequency current is not needed for the lamp operation. When MOSFET Q5 is switched OFF, the buck network, formed by inductor L1 and capacitor C1, and the ignition network, formed by transformer T and ignition capacitor C2, are completely decoupled. That is, ignition capacitor C2 is electrically disconnected from the circuit. There is no charge (or discharge) current flowing through the ignition capacitor C2 or the current sensing resistor Rs, due to the switching of transistors Q1 and Q2. Further, diode D5 prevents any voltage overshoot during the switching of MOSFET Q5.

The disadvantage of this modification is that a high voltage MOSFET Q5 and a high voltage diode D5 is required, along with any associated driving circuitry required to drive MOSFET Q5. This increases the circuit complexity and increases the manufacturing costs. It is noted that if the composite waveform of the high frequency current and the DC current is required to prevent an acoustic resonance, MOSFET Q5 has to be turned ON during the high frequency period and turned OFF during the low frequency period.

A dual stage output filter of U.S. Pat. No. 6,020,691 is illustrated in FIG. 3(c), in which a chopper (or buck) power regulator with a high frequency resonant ignition, a discontinuous first resonant stage inductor current, and a continuous second resonant stage inductor current are related to each other.

In U.S. Pat. No. 6,020,691, a first stage resonant frequency fr1, formed by inductor L1 and capacitor C1, is lower than a second stage resonant frequency fr2, formed by inductor L2 and capacitor C2. In addition, a distance between the first stage resonant frequency fr1 and the second stage resonant frequency fr2 is somewhat confined not to be less than a selected minimum value, in order to avoid an excessive resonant current circulating in the circuit. The ignition voltage is generated by sweeping the frequency over the second stage resonant frequency, fr2. For example, if the second stage resonant frequency fr2 is selected to be, for example, approximately 40 kHz and a minimum sweeping frequency is selected to be, for example, approximately 30 kHz, the first stage resonant frequency fr1 may be selected to be, for example, approximately 22 kHz. This kind of circuit arrangement suffers from frequency inaccuracies and component tolerance problems, because the circulating current of the first stage resonant network is highly related to the frequency fr1 and the minimum sweeping frequency. A further disadvantage of this circuit arrangement is that the magnitude of the ignition pulse, which is mainly generated by the second stage network, is a function of both resonant frequencies, since two stages are cascaded together. The input voltage signal, with its frequency near the second stage resonant frequency, is damped by the first stage network and amplified by the second stage network. Thus, the Q factor of the second stage network has to be significantly high so that enough ignition voltage can be generated.

SUMMARY OF THE INVENTION

The present invention overcomes the inability of the prior art to electrically separate (isolate) the first resonant network design and the second resonant network design. According to the present invention, the ignition capacitor is isolated from the circuit to prevent a charge current (and/or discharge current) from interfering with a load current sense circuit.

According to a feature of the invention, a relatively "clean" signal is provided to a current sensing circuit of a buck regulator, even when a relatively high spike current is fed to the ignition capacitor.

According to an advantage of the present invention, a damping device, such as, for example, a damping resistor, is provided, such that a variation of a peak ignition voltage that is generated is limited to a minimal parasitic capacitance, such as, for example, a few hundred pico-farads, at the output.

According to another object of the invention, leakage current through the path of a bypass diode is significantly less than the current flowing through the sensing resistor, so that the current sensing is not affected by the diode leakage current.

According to an object of the present invention, a discharge lamp driving circuit, comprises a tank circuit, and a DC-AC inverter. The tank circuit has two resonant networks, and a lamp driving connection. The lamp driving connection is electrically connected to a lamp. The DC-AC inverter is electrically connected to a voltage input and to the tank circuit. A first resonant network of the tank circuit delivers an alternating rectangular current during a normal operation mode, while a second resonant network of the tank circuit delivers an alternating resonant ignition voltage during a starting operation mode. The tank circuit is configured so that the second resonant network includes at least one damping resistor in series with at least one resonant capacitor.

According to a feature of the invention, the DC-AC inverter may be either a full bridge inverter or a half bridge inverter.

According to an advantage of the invention, the first resonant network comprises a capacitor and an inductor that are electrically connected in series, and the first resonant network is connected to an output of the bridge circuit.

According to another advantage of the invention, the second resonant network comprises an inductor, a capacitor and a damping device. The inductor, capacitor and damping device are electrically connected in series, with the second resonant network being connected to an output of the bridge inverter and the bypass device.

A further advantage of the invention resides in the lamp driving connection being electrically connected in series with an inductor of the second resonant network and an inductor of the first resonant network, with the serially connected lamp driving connection and inductor of the second resonant network being further connected in parallel with a capacitor of the first resonant network.

Another object of the present invention resides in a discharge lamp driving circuit that comprises a tank circuit and a DC-AC inverter. The tank circuit has a first resonant network, a second resonant network, and a lamp driving connection. The lamp driving connection is electrically connected to a lamp. The DC-AC inverter, which is electrically connected to a voltage input and to the tank circuit, includes a sensing device, a bypass device associated with the second resonant network and a bridge circuit. The sensing device operates to sense an amount of current of the first resonant network in the tank circuit, while the bypass device operates to decouple the current flow of the second resonant network from the current flow of the first resonant network.

According to an advantage of the invention, the sensing device, which may be, for example, a sensing resistor, is connected in parallel with the bypass device.

According to a feature of the invention, the DC-AC inverter includes a bridge inverter, such as, for example, a full bridge inverter or a half bridge inverter.

A still further feature of the invention resides in the first resonant network comprising a capacitor and an inductor that are electrically connected in series, the first resonant network being connected to an output of the bridge inverter.

Another feature of the invention pertains to the second resonant network comprising an inductor, a capacitor and a damping device. The inductor, capacitor, and damping device are electrically connected in series, the second resonant network being connected to an output of the bridge inverter and the bypass device.

It is noted that the lamp driving connection may be electrically connected in series with an inductor of the second resonant network and an inductor of the first resonant network. The serially connected lamp driving connection and inductor of the second resonant network being further connected in parallel with a capacitor of the first resonant network.

Further, the sensing device may be connected between a first input connection of the voltage input and a first input of a bridge inverter, a second input of the bridge inverter being connected to a second input connection of the voltage input.

According to another object of the invention, a discharge lamp driving circuit comprises a tank circuit and a DC-AC inverter. The tank circuit includes a first resonant network, a second resonant network, and a lamp driving connection, with the lamp driving connection being electrically connected to a lamp. The DCAC inverter is connected to a voltage input and the tank circuit. The first resonant network delivers an alternating rectangular current (which may having an operating frequency of less than approximately 1 kHz) to the lamp during a normal operation mode, while the second resonant network delivers an alternating resonant ignition voltage (which may have an operating frequency greater than approximately 20 kHz) to the lamp during a starting operation mode. Additionally, the second resonant network includes at least one damping resistor in series with at least one resonant capacitor. The DC-AC inverter includes a sensing device, a bypass device, and a bridge inverter. The sensing device senses a current flow of the first resonant network while the bypass device de-couples a current flow of the first resonant network and a current flow of the second resonant network.

According to a feature of the invention, the sensing device is connected in parallel with the bypass device, which may comprise, for example, two series connected diodes. The sensing device may be connected between a first input connection of the DC voltage input and a first input of a bridge inverter, while a second input of the bridge inverter is connected to a second input connection of the DC voltage input.

A junction of the two series connected diodes may be connected to the second resonant network. In addition, a leakage preventing device may be connected in series with at least one of the two series connected diodes. The leakage preventing device exhibits a resistance that is greater than a resistance of the sensing device. Preferably, the resistance of the leakage preventing device is equal to at least twenty times said resistance of the sensing device.

According to another feature of the invention, the DC-AC inverter may be a full bridge inverter or a half bridge inverter.

According to an advantage of the invention, the first resonant network may comprise a capacitor and an inductor that are electrically connected in series, with the first resonant network being connected to an output of the bridge inverter. Further, the second resonant network may comprise an inductor, a capacitor and a damping device, in which the inductor, the capacitor and the damping device are electrically connected in series, the second resonant network being connected to an output of the bridge inverter and the bypass device.

The lamp driving connection may be electrically connected in series with an inductor of the second resonant network and an inductor of the first resonant network, with the serially connected lamp driving connection and inductor of the second resonant network being further connected in parallel with a capacitor of the first resonant network.

According to a still further object of the invention, a method is disclosed for driving a discharge lamp. According to the method, a lamp is electrically connected to a lamp driving output of a tank circuit having a first resonant network and a second resonant network, with a voltage being input to the tank circuit from a DC-AC inverter. The DC-AC inverter is electrically connected to a voltage input. The DC-AC inverter includes a sensor, a bypass device associated with the second resonant network, and a bridge circuit. An amount of current flowing in the first resonant network of the tank circuit is monitored with the sensor, while the current flowing in the second resonant network is decoupled from a current flowing in the first resonant network with the bypass device.

According to a feature of the invention, the sensor may be connected in parallel with the bypass device. The bypass device may comprise two series connected diodes. In such a configuration, a leakage prevention device may be electrically connected in series with at least one of the two series connected diodes. The leakage prevention device preferably exhibits a resistance that is at least twenty times greater than a resistance of the sensing device.

An additional feature of the invention is the inclusion of a bridge inverter, the first resonant network including a capacitor and an inductor that are electrically connected in series, the first resonant network being connected to the output of the bridge inverter.

A still further feature of the invention is that the second resonant network includes an inductor, a capacitor and a damping device. The inductor, the capacitor, and the damping device are electrically connected to an output of the bridge inverter and the bypass device.

A still further object of the invention pertains to a method for driving a discharge lamp that is electrically connected to a lamp driving output of a tank circuit, in which the tank circuit has a first resonant network and a second resonant network, the voltage being input to the tank circuit from the DC-AC inverter, the second resonant network having at least one damping resistor in series with at least one resonant capacitor, and in which a DC-AC inverter. having a sensor, a bypass device, and a bridge circuit is electrically connected to the DC voltage input and to the tank circuit. The method comprises operating the tank circuit such that the second resonant network delivers an alternating current ignition voltage to the lamp during a startup operation mode. After a lapse of a predetermined time period, the tank circuit is operated such that the first resonant network delivers an alternating rectangular current to the lamp during a normal operation mode. A current flow in the first resonant network is sensed with the sensor, while a current flow in the second resonant network is decoupled from the current flow in the first resonant network with the bypass device of the DC-AC inverter.

BRIEF DESCRIPTION OF THE DRAWINGS

The foregoing and other objects, features and advantages of the invention will be apparent from the following more particular description of the preferred embodiment, as illustrated in the accompanying drawings, in which like characters refer to the same parts throughout the various views, and wherein:

FIGS. 5(a) to 5(e) show various ideal waveforms produced at predetermined points of the circuit shown in FIG. 4;

DETAILED DESCRIPTION OF THE INVENTION

Figure 1A:
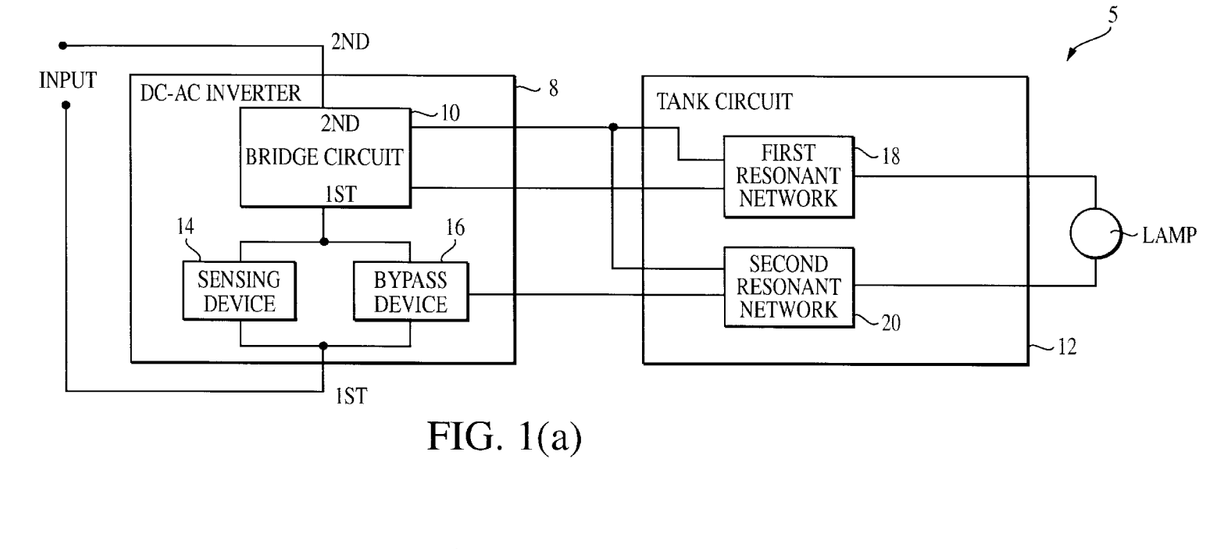
FIG. 1(a) illustrates a block diagram of a lamp driving circuit of the present invention.

FIG. 1(a) illustrates a block diagram of the present invention. As shown in FIG. 1(a), a driving circuit 5 comprises a DC-AC inverter 8, and a tank circuit 12. The tank circuit 12 operates (e.g., provides electrical power to) a lamp, such as, for example, a high intensity discharge lamp LAMP.

The DC-AC inverter 8 comprises BRIDGE circuit 10, a sensing device 14 and a bypass device 16. The DC-AC inverter 8 may be formed as either a full bridge inverter or a half bridge inverter.

The tank circuit 12 comprises a first resonant network 18 and a second resonant network 20.

Figure 1B:
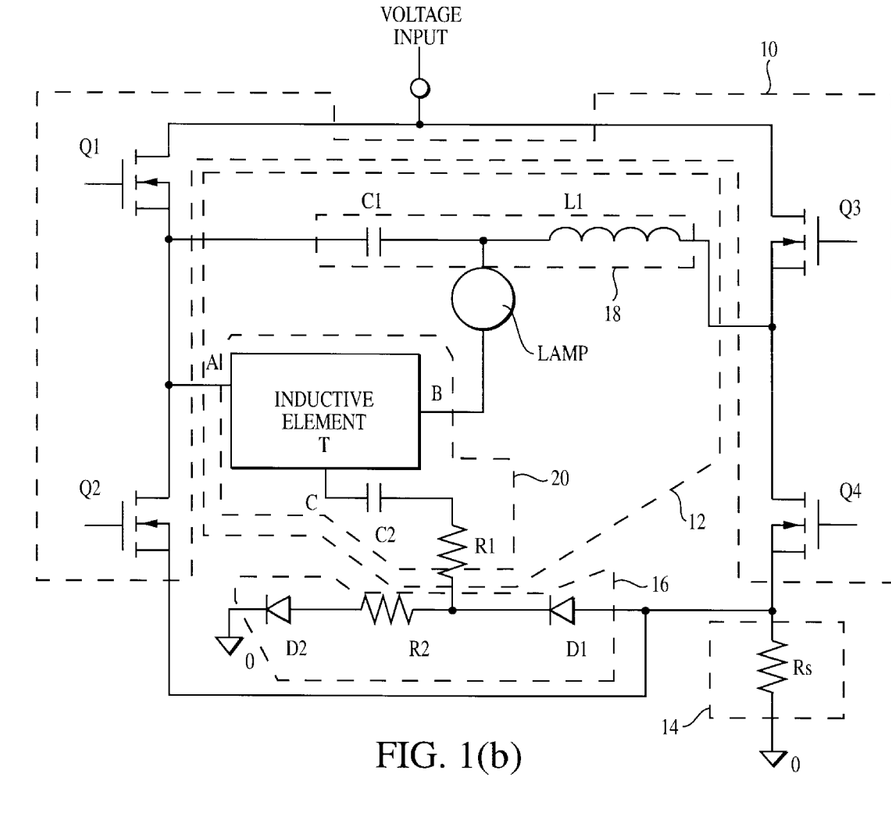
FIG. 1(b) illustrates a schematic diagram of an embodiment of the invention shown in FIG. 1(a)

FIG. 1(b) illustrates a specific circuit arrangement of the present invention. However, it is understood that variations therein may be made without departing from the spirit and/or scope of the instant invention.

The bridge circuit 10 comprises a plurality of MOSFET transistors Q1 to Q4 that are configured in a all bridge arrangement. The first resonant network 18 of the tank circuit 12 comprises a capacitor C1, and an inductor L1. The second resonant network 20 of the tank circuit 12 comprises an ignition capacitor C2, a first resistor R1, and an inductive element T. The sensing device 16 comprises a sensing resistor Rs, while the bypass device comprises diodes D1 and D2 that are connected in series via a resistor R2.

One wire lead of a high intensity discharge (HID) lamp LAMP is connected to a junction of capacitor C1 and inductor L1, while a second wire lead of the HID lamp LAMP is connected to a junction B of the inductive element T. FIG. 1(b) shows the electrical connection of the lamp with respect to the tank circuit 12; however, it is understood that this depiction of the lamp is for the purpose of conveying the electrical connection of the lamp to the first and second resonant circuits 18 and 20 of the tank circuit 12, and is separate from (not a part of) the tank circuit 12.

Inductor L1 and capacitor C1 of the first resonant circuit 18 form a chopper (or buck) filter network. Inductive element T and ignition capacitor C2 of the second resonant circuit 20 form a high frequency resonant network, while the resonant damping resistor R1 functions to reduce a quality factor and widen a bandwidth of the high frequency resonant network.

Bypass diodes D1 and D2 of the bypass device 16 control a current flow from the ignition capacitor C2 through the sensing resistor Rs, while resistor R2 operates to prevent (or reduce) any current from MOSFET Q2 and/or MOSFET Q4 from flowing through bypass diodes D1 and D2. Preferably, resistor R2 has a resistance value that is much higher (greater) than a resistance value of the sensing resistor Rs. Resistor R2, which is electrically installed in series with resistor R1, also functions as a damping resistor.

Figure 1C:
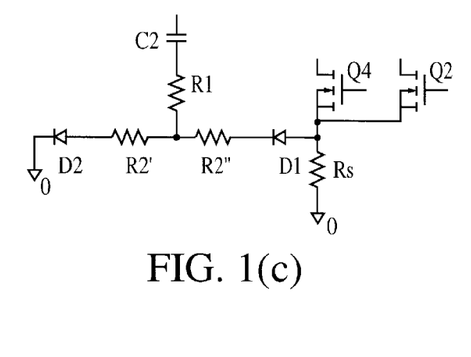
FIG. 1(c) illustrates a high impedance path connection of the circuit shown in FIG. 1(b)

According to a variation shown in FIG. 1(c), resistor R2 comprises a plurality (e.g., two in FIG. 1(c)) resistors, which may (or may not) be of equal value. In this variation, one resistor is connected in series with bypass diode D2 while the other resistor is connected in series with bypass diode D1.

During a starting (igniting) operation, an ignition network (formed by the inductive element T, capacitor C2, resistor R1 and resistor R2) is energized by a frequency varying and duty cycle varying source supplied to a voltage supply line $V_{bus}$, MOSFET Q1, and MOSFET Q2. By controlling the switching rate of MOSFETS Q1 and Q2 (e.g., the frequency at which the system turns ON and OFF), the frequency and/or duty cycle in each high frequency cycle can be linearly swept from a first (e.g., high) frequency, of, for example, approximately 200 kHz, to a second (e.g., low) frequency, of, for example, approximately 100 kHz.

Figure 2A:
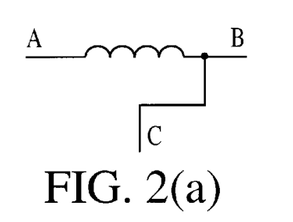
FIGS. 2(a), 2(b), and 2(c) illustrate various inductive elements that are utilized with the invention of FIG. 1(b)
Figure 2B:
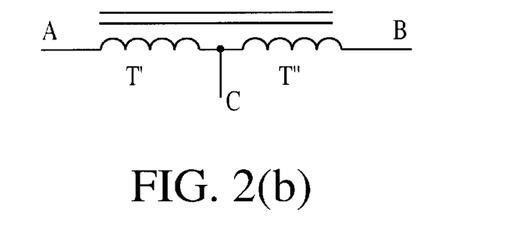
Figure 2C:
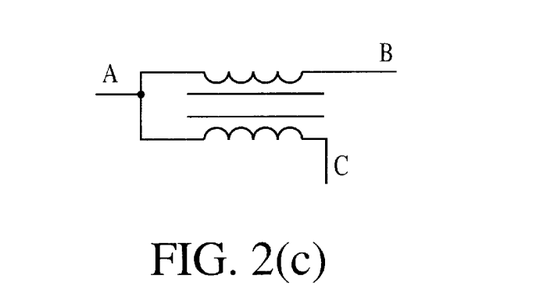

The following discussion is based on the assumption that the inductive element T shown in FIG. 2(b) is used in the circuit of FIG. 1(b). Given the above operating frequencies, first inductor T' has a value of approximately 750 uH, capacitor C2 has a value of approximately 1.5 nF, and any parasitic capacitance that may exist will be in the range of approximately 0 pF to a maximum of approximately 150 pF. The parasitic capacitance is reflected to the inductor T' that forms part of a capacitive element of the resonant network with capacitor C2. Because of the reflection, the resonant frequency changes. Based upon simulations that have been performed, the resonant frequencies become equal to approximately 143 kHz; 135 kHz; 127 kHz; and 121 kHz in response to the presence of a parasitic capacitance equal to approximately 0 pF; 50 pF; 100 pF; and 150 pF, respectively.

It is noted that the resonant frequency is not effected (changed) by the presence or absence of the damping resistor; however, variations in circuit gains with respect to the parasitic capacitance do occur. It is also noted that, variations in the circuit gains (with respect to the parasitic capacitance) is decreased when the damping resistor is included. For example, without the damping resistor, a peak gain decreases approximately 16.7 percent over a parasitic capacitance range from 0 pF to 150 pF. However, when a damping resistor R1, having a value of approximately 30 ohms is included in the circuit, the peak gain decreases only about 6.3 percent over the same 0 pF to 150 pF range.

From the above, it is apparent that the inclusion of the damping resistor plays a role in stabilizing the gain. For a given driving source and frequency sweeping pattern, the peak magnitude of the ignition voltage is proportional to the gain of the resonant network. As noted above, the gain varies by only approximately 6.3 percent with the inclusion of the damping resistor, and thus, the ignition voltage stays within a predetermined limit when the parasitic capacitance varies from 0 pF to 150 pF. It is noted that in applications where the lamp leads may be up to approximately 15 feet, it was measured that the equivalent capacitance is approximately 150 pF.

Figure 8A:
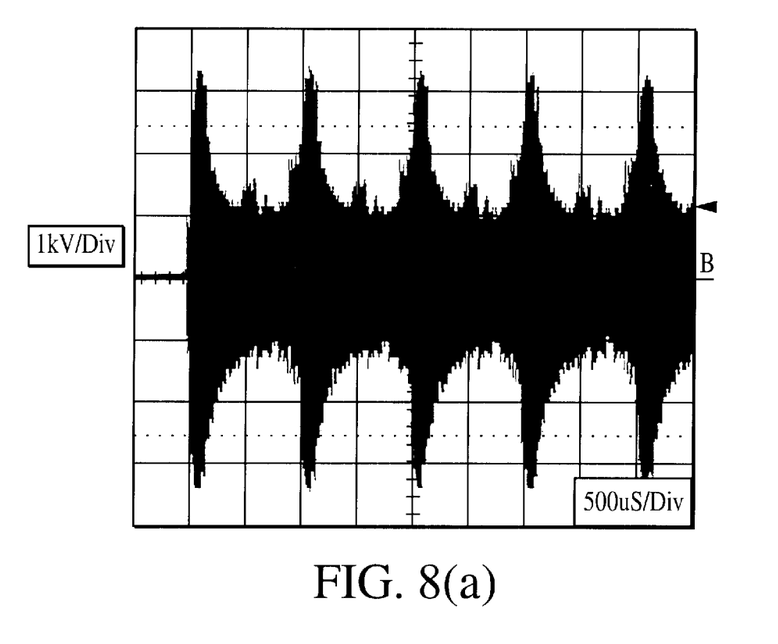
FIG. 8(a) illustrates an ignition voltage envelope at the lamp ends with no leads.
Figure 8B:
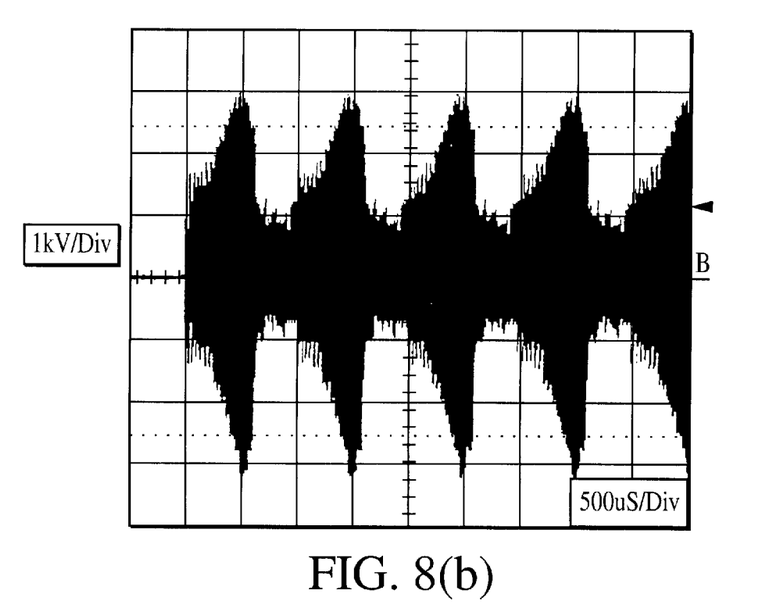
FIG. 8(b) illustrates the ignition voltage envelope at the lamp ends with 15 feet of lamp leads.

FIGS. 8(a) and 8(b) illustrate an ignition voltage envelope when the lamp leads are 0 feet and 15 feet in length, respectively. In this regard, it is noted that the Inductive Element T of FIG. 2(a) has been employed, and further, that a small value capacitor (of, for example, approximately 150 pF) can be added across terminal points B and C (see FIG. 2(a)) to reduce (filter) some of the very high frequency ringing shown in the figures.

During the starting (igniting) operation, MOSFET Q3 and MOSFET Q4 are switched in-phase with MOSFET Q2 and MOSFET Q1, respectively. Since the resonant frequency of the chopper (buck) filter network (formed by inductor L1 and capacitor C1) is much lower than the sweeping frequencies of approximately 100 kHz to 200 kHz, only a small resonant voltage is generated across inductor L1 or capacitor C1. Once the lamp is ignited during the starting operation, lamp current flows through MOSFET pair Q1 and Q4 at one-half of the high frequency cycle, and through MOSFET pair Q2 and Q3 at one-half of the high frequency cycle during the second half of the high frequency cycle.

During the normal operation of the lamp (e.g., after the lamp is ignited/started), MOSFET Q1 and MOSFET Q2 operate at a low frequency of, for example, approximately 170 Hz, while MOSFET Q3 and MOSFET Q4 operate at a high frequency of, for example, approximately 50 kHz. Alternatively, MOSFET pair Q1 and Q4 may be operated at a high frequency of, for example, approximately 50 kHz, during a first half of a low frequency cycle of, for example, approximately 170 Hz, while MOSFET pair Q2 and Q3 are operated at the high frequency (e.g., approximately 50 kHz) during the other half of the low frequency cycle (e.g., approximately 170 Hz). During a normal operation with a low lamp voltage, all switches can operate in high frequency. In either case, the voltage at the junction of MOSFET Q1 and MOSFET Q2 (e.g., point A in FIG. 1(b)) is HIGH when MOSFET Q1 is ON and LOW when MOSFET Q2 is ON. During a high voltage to low voltage transition (or low voltage to high voltage transition), there is a charge (or discharge) of current flowing through the ignition capacitor C2.

Figure 4:
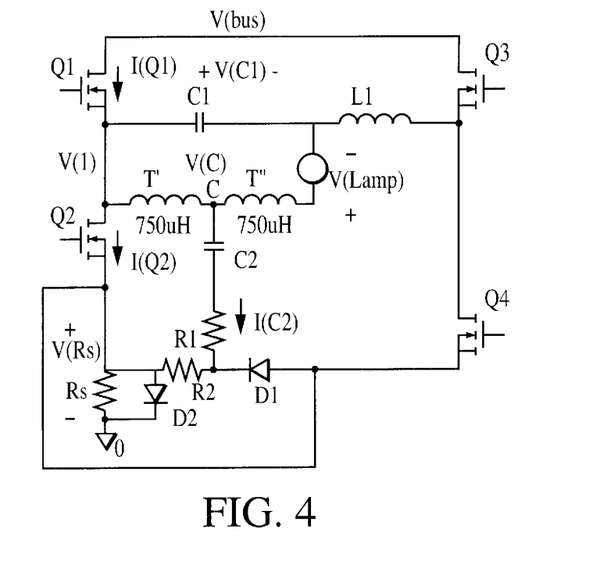
FIG. 4 represents the circuit of FIG. 1(a) with the inductive element of FIG. 2(b)

A detailed operation explanation for the case of a low lamp voltage will now be provided. FIG. 4 represents the circuit of FIG. 1(b) with the Inductive Element T of FIG. 2(b), while FIGS. 5(a) to 5(e) represent waveforms at various locations of the circuit of FIG. 4. The resonant frequency of the chopper (buck filter) network formed by capacitor C1 and inductor L1 is lower than the high frequency, of, for example, approximately 50 kHz, in normal operation. The resonant frequency of the inverter network (ignition network), formed by capacitor C2, resistor R1, and inductive element T', is higher than the high frequency (e.g., approximately 50 kHz) during the normal operation. The voltage across capacitor C1 may be considered to be constant during one high frequency cycle. The voltage across inductors T' and T'' may be considered to be zero during one high frequency cycle.

Lamp voltage V(lamp) is equal to the voltage on capacitor C1. Thus, the voltage at point C in FIG. 4 is equal to voltage V(1). At time t equals 0, MOSFET transistors Q2 and Q3 are ON and MOSFET transistors Q1 and Q4 are OFF. Chopper current V(Rs) ramps up and reaches a predetermined peak level, at which point, MOSFET Q3 turns OFF and a freewheeling current starts to flow through inductor L1, capacitor C1, the lamp, and the internal diodes of MOSFET transistors Q2 and Q4, until time t equals t1. At time t equals t1, MOSFET Q2 turns OFF. A freewheeling current continues to flow through the internal diode of MOSFET Q1 and back into the bus line, until the current reaches zero at time t equals t2. At time t equals t2, a new cycle initiates.

At time t equals t0 and time t equals t1, voltage V(1) suddenly switches from HIGH to LOW (or LOW to HIGH). The relationship between the voltage V(1) at point C and current I(C2) flowing through capacitor C2 can be expressed by the equation:

$$I(C2) = C2 * dV(1)/dt,$$

neglecting any parasitic inductance and the damping resistors R1 and R2.

Figures 5A, 5E:
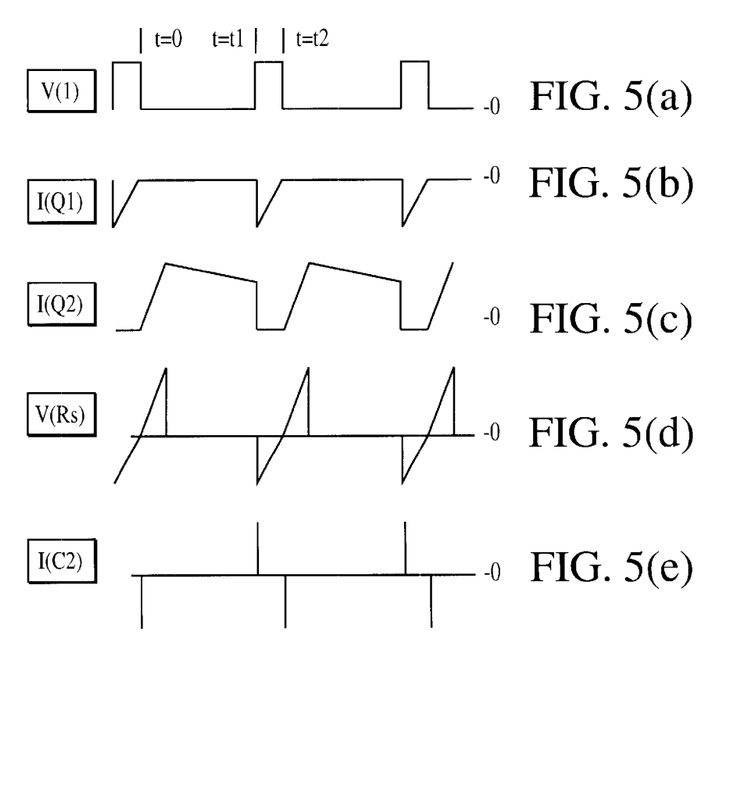

The voltage across a capacitor does not instantaneously change. Thus, a spiky capacitive current I(C2) occurs, as shown in FIG. 5(e). The spiky charge (or discharge) current I(C2) of capacitor C2, is only limited by the rising (or falling) slope of voltage V(1), the parasitic inductance, the parasitic resistance, and the values of resistors R1 and R2. It is noted that the peak magnitude of the current I(C2) can be very high. If this current flows through the sense resistor Rs, and is not bypassed by bypass diodes D1 and D2, the total voltage on the sense resistor Rs is the combination of the current I(C2) and part of the chopper current I(Q2). In such a situation, the sensing voltage will be significantly distorted, which will affect the control of the chopper operation.

Figure 6A:
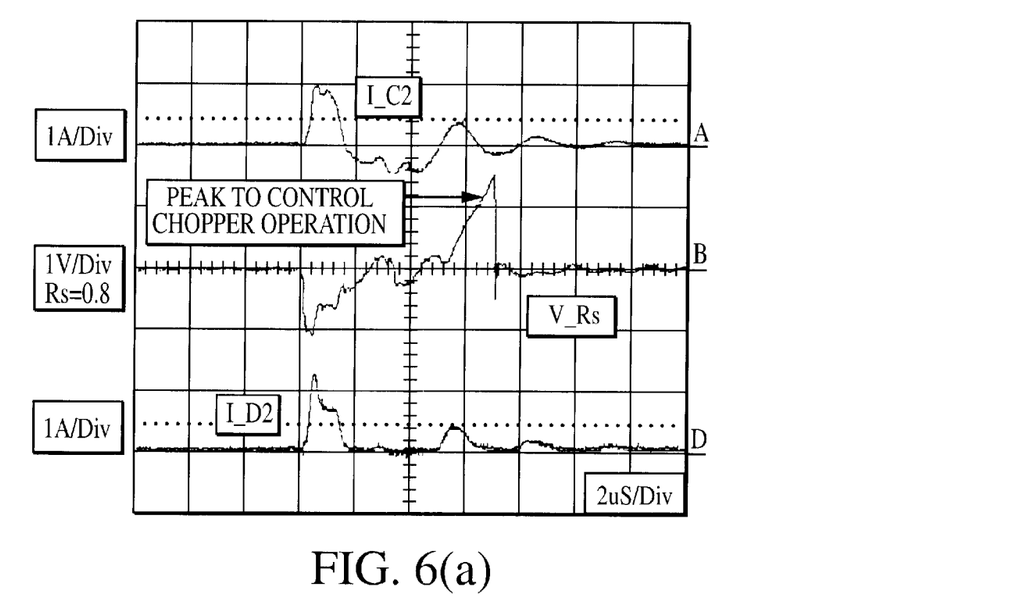
FIG. 6(a) illustrates the amount of current flowing through an ignition capacitor C2 at a predetermined load voltage, a current flowing through a bypass diode D2, and a sensing voltage across a sensing resistor Rs, the electronic components being utilized in the circuit of FIG. 4.
Figure 6B:
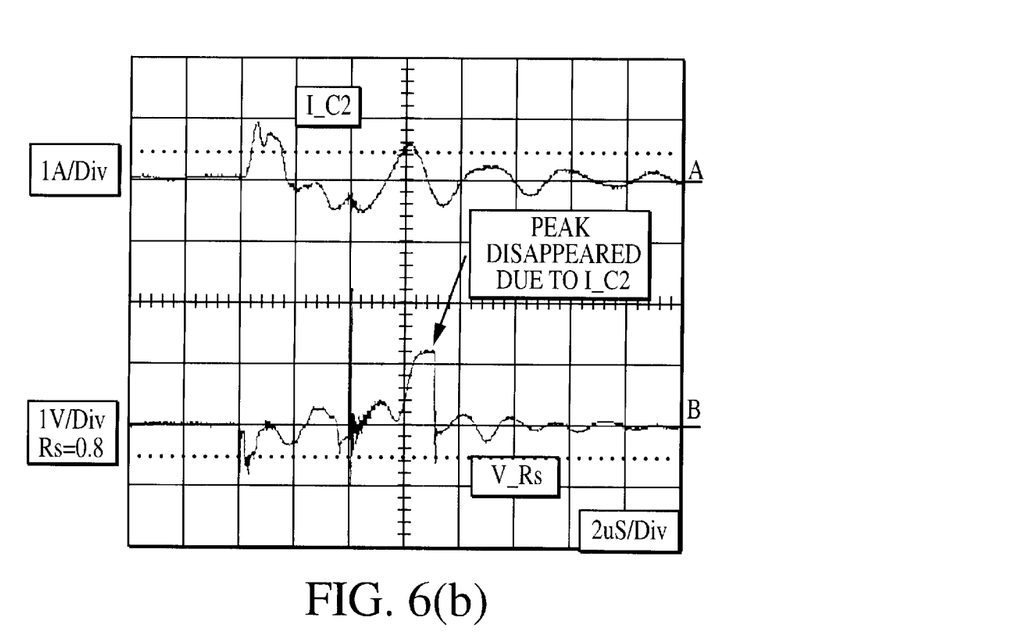
FIG. 6(b) illustrates the amount of current flowing through the ignition capacitor C2, and the voltage on the sense resistor Rs without the bypass diode.

Actual waveforms, with and without the bypass diodes D1 and D2, are shown in FIGS. 6(a) and 6(b), respectively. As can be seen from the drawings, a positive portion of the current I(C2) flows through I(D2), in which I(C2) is equal to I(D2) when I(C2) is greater than 0. It is noted that a negative portion of the current I(C2) flows through the bypass diode D1, which is not shown FIGS. 6(a) and 6(b). A controlling sense voltage, illustrated by the middle trace in FIG. 6(a), comprises a triangular waveform that exhibits minimal distortion in comparison with the triangular chopper current. When the bypass diodes are omitted, the entire current I(C2) combines with current I(Rs) to form V(Rs), as shown in FIG. 6(b). A negative portion of the sense voltage almost disappears, due to its combination with the positive portion of the current I(C2). The sensing voltage is significantly distorted in comparison with the chopper current, and the top of the sense voltage is flattened out. The peak of the chopper current that is supposed to be reflected on the sense resistor is not the same as the voltage on the sense resistor. It is noted that it is not possible (or, at least, it is very difficult) to control the peak current of the chopper operation.

The sensed chopper current, or the current through inductor L1, is fed back to control an ON time of chopper switches Q3 and Q4. Further, it is noted that a DC voltage source Vbus is provided by either a power factor correction circuit or directly from a rectified and filtered AC line without power factor correction.

Figure 7A:
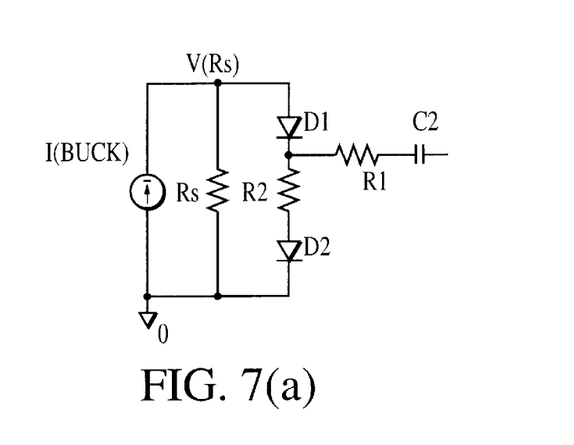
FIG. 7(a) illustrates an equivalent circuit for preventing leakage current through bypass diodes.
Figure 7B:
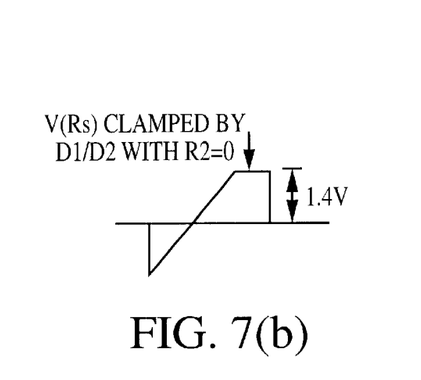
FIGS. 7(b) and 7(c) illustrate associated waveforms of the circuit of FIG. 7(a)
Figure 7C:
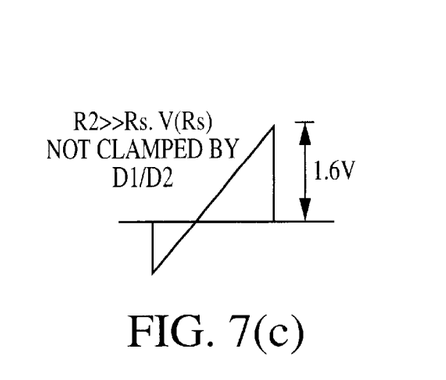

FIG. 7(a) illustrates a portion of the circuit shown in FIG. 1(b). Resistor R2 primarily serves as a high impedance path relative to the sense resistor Rs, in order to limit the chopper current flowing through the bypass diodes D1 and D2. A full bridge inverter used with the chopper network forms a triangular current source, as illustrated in FIGS. 7(b) and 7(c). During a normal operation, the operating frequency is much lower than the ignition network, and thus, capacitor C2 is effectively open (out of the circuit). When the value of resistor R2 is zero. the maximum voltage on the sense resistor Rs is clamped to approximately 1.4 volts by the conduction of bypass diodes D1 and D2.

As shown in FIG. 7(b), the sense voltage V(Rs) exhibits a flat top on its positive waveform, indicating that the waveform is distorted. Bypass diodes D1 and D2 will start to conduct, flowing leakage current whenever they are forward biased. The peak sense voltage V(Rs) is generally in the range between approximately 1 Vpk to approximately 2 Vpk. It is noted that it is difficult to accurately control the peak current.

When the value of resistor R2 is significantly larger than the value of the sense resistor Rs, current leakage from bypass diodes D1 and D2 and resistor R2 is negligible. The voltage V(Rs) on the sense resistor Rs reflects the true chopper current, as illustrated in FIG. 7(c). For example, the resistance of the sense resistor Rs is 0.8 ohms for an approximate 70 watt HID lamp with an approximate 1.3 ampere starting current and a peak chopper current of approximately 2 amperes. Based on the formula voltage equals current multiplied by resistance (V=I * R), the peak sense voltage V(Rs) is equal to 2 Amp * 0.8 ohms, or 1.6 volts, which is larger than the 1.4 volt clamping voltage of the bypass diodes D1 and D2. Thus, the value of resistor R2 is chosen to be much larger than the sense resistor (i.e., approximately 20 times the sense resistor Rs, or approximately 15 ohms).

Resistor R2 also functions as a damping resistor in series with resistor R1 when the HID lamp is being started (ignited). Resistor R2 damps a positive portion of the peak resonant voltage when MOSFET Q1 is ON when resistor R2 is connected in the arrangement shown in FIG. 1(b). In order to dampen both the positive and negative portions of the peak resonant voltage (or just the negative portion of the peak resonant voltage), the connection shown FIG. 1(c) should be adopted.

While the invention has been particularly shown and described with reference to the preferred embodiments thereof, it is understood by those skilled in the art that various alterations in form and/or detail may be made without departing from the spirit and/or scope of the invention, as defined by the following claims. For example, an acoustic resonance may be avoided by modifying the present invention to use a high frequency current that is interrupted by a smoothed DC current during a normal operation of a HID lamp. Alternatively, the bridge circuit 10 may be configured as a half bridge circuit.

What is claimed is:

1. A discharge lamp driving circuit, comprising:
    a tank circuit with two resonant networks, said tank circuit having a lamp driving connection, said lamp driving connection being electrically connected to a lamp; and
    a DC-AC inverter electrically connected to a voltage input and to said tank circuit, a first resonant network of said tank circuit delivering an alternating rectangular current during a normal operation mode, a second resonant network of said tank circuit delivering an alternating resonant ignition voltage during a starting operation mode, wherein said second resonant network includes at least one damping resistor in series with at least one resonant capacitor.

2. The discharge lamp driving circuit of claim 1, wherein said DC-AC inverter comprises a bridge inverter.

3. The discharge lamp driving circuit of claim 2, wherein said bridge inverter comprises a full bridge inverter.

4. The discharge lamp driving circuit of claim 2, wherein said bridge inverter comprises a half bridge inverter.

5. The discharge lamp driving circuit of claim 1, wherein said first resonant network comprises a capacitor and an inductor that are electrically connected in series, said first resonant network being connected to an output of said DC-AC inverter.

6. The discharge lamp driving circuit of claim 1, further comprising a bypass device that controls a current flow, said second resonant network being connected to an output of said DC-AC inverter and said bypass device.

7. The discharge lamp driving circuit of claim 1, wherein said lamp driving connection is electrically connected in series with an inductor of said second resonant network and an inductor of said first resonant network, said serially connected lamp driving connection and inductor of said second resonant network being further connected in parallel with a capacitor of said first resonant network.

8. A discharge lamp driving circuit, comprising:
    tank circuit having a first resonant network and a second resonant network, said tank circuit having a lamp driving connection, said lamp driving connection being electrically connected to a lamp; and
    a DC-AC inverter electrically connected to a voltage input and to said tank circuit, said DC-AC inverter including a sensing device, a bypass device associated with said second resonant network, and a bridge circuit, said sensing device operating to sense an amount of current flowing in said first resonant network of said tank circuit, while said bypass device operates to decouple said current flow of said second resonant network from said current flow of said first resonant network.

9. The discharge lamp driving circuit of claim 8, wherein said sensing device is connected in parallel with said bypass device.

10. The discharge lamp driving circuit of claim 8, wherein said sensing device comprises a sensing resistor.

11. The discharge lamp driving circuit of claim 8, wherein said DC-AC inverter comprises a bridge inverter.

12. The discharge lamp driving circuit of claim 11, wherein said bridge inverter comprises a full bridge inverter.

13. The discharge lamp driving circuit of claim 11, wherein said bridge inverter comprises a half bridge inverter.

14. The discharge lamp driving circuit of claim 8, wherein said first resonant network comprises a capacitor and an inductor that are electrically connected in series, said first resonant network being connected to an output of said DC-AC inverter.

15. The discharge lamp driving circuit of claim 8, wherein said second resonant network comprises an inductor, a capacitor, and a damping device, said inductor, said capacitor and said damping device being electrically connected in series, said second resonant network being connected to an output of said DC-AC inverter and said bypass device.

16. The discharge lamp driving circuit of claim 8, wherein said lamp driving connection is electrically connected in series with an inductor of said second resonant network and an inductor of said first resonant network, said serially connected lamp driving connection and inductor of said second resonant network being further connected in parallel with a capacitor of said first resonant network.

17. The discharge lamp driving circuit of claim 8, wherein said sensing device is connected between a first input connection of said DC-AC inverter and a first input of said bridge circuit, a second input of said DC-AC inverter being connected to a second input connection of said bridge circuit.

18. A discharge lamp driving circuit, comprising:
    a tank circuit having a first resonant network and a second resonant network, said tank circuit having a lamp driving connection, said lamp driving connection being electrically connected to a lamp; and
    a DC-AC inverter that is connected to said DC voltage input and to said tank circuit, said first resonant network delivering an alternating rectangular current to said lamp during a normal operation mode, said second resonant network delivering an alternating resonant ignition voltage to said lamp during a starting operation mode, wherein said second resonant network includes at least one damping resistor in series with at least one resonant capacitor, said DC-AC inverter including a sensing device, a bypass device, and a bridge circuit, said sensing device sensing a current flow of said first resonant network while said bypass device de-couples a current flow of said first resonant network and a current flow of said second resonant network.

19. The discharge lamp driving circuit of claim 18, wherein said sensing device is connected in parallel with said bypass device.

20. The discharge lamp driving circuit of claim 19, wherein said bypass device comprises two series connected diodes.

21. The discharge lamp driving circuit of claim 18, wherein said alternating rectangular current delivered by said first resonant network has a frequency of less than approximately 1 kHz, and said alternating resonant ignition voltage delivered by said second resonant network has a frequency greater than approximately 20 kHz.

22. The discharge lamp driving circuit of claim 18, wherein said DC-AC inverter comprises a fill bridge inverter.

23. The discharge lamp driving circuit of claim 18, wherein said DC-AC inverter comprises a half bridge inverter.

24. The discharge lamp driving circuit of claim 18, wherein said first resonant network comprises a capacitor and an inductor that are electrically connected in series, said first resonant network being connected to an output of said DC-AC inverter.

25. The discharge lamp driving circuit of claim 18, wherein said second resonant network being connected to an output of said DC-AC inverter and said bypass device.

26. The discharge lamp driving circuit of claim 18, wherein said lamp driving connection is electrically connected in series with an inductor of said second resonant network and an inductor of said first resonant network, said serially connected lamp driving connection and said inductor of said second resonant network being further connected in parallel with a capacitor of said first resonant network.

27. The discharge lamp driving circuit of claim 18, wherein said sensing device is connected between a first input connection of said DC-AC inverter and a first input of a bridge circuit, a second input of said bridge circuit being connected to a second input connection of said DC-AC inverter.

28. The discharge lamp driving circuit of claim 9, wherein said bypass device comprises two series connected diodes.

29. The discharge lamp driving circuit of claims 20, 28, wherein a junction of said two series connected diodes is connected to said second resonant network.

30. The discharge lamp driving circuit of claims 20, 28, further comprising a leakage preventing device connected in series with at least one of said two series connected diodes.

31. The discharge lamp driving circuit of claim 30, wherein said leakage preventing device exhibits a resistance that is greater than a resistance of said sensing device.

32. The discharge lamp driving circuit of claim 31, wherein said resistance of said leakage preventing device is equal to at least twenty times said resistance of said sensing device.

33. A method for driving a discharge lamp, comprising:

electrically connecting a lamp driving output of a tank circuit to a lamp, the tank circuit having a first resonant network and a second resonant network;

electrically connecting a DC-AC inverter to the DC voltage input, the DC-AC inverter including a sensor, a bypass device associated with the second resonant network, and a bridge circuit, a voltage being input to the tank circuit from the DC-AC inverter;

monitoring an amount of current flowing in the first resonant network of the tank circuit with the sensor; and decoupling the current flowing in the second resonant network from a current flowing in the first resonant network with the bypass device.

34. The method of claim 33, further comprising connecting the sensor in parallel with the bypass device.

35. The method of claim 34, further comprising using two series connected diodes as the bypass device.

36. The method of claim 35, further comprising electrically connecting a leakage prevention device in series with at least one of the two series connected diodes.

37. The method of claim 36, further comprising ensuring that the leakage prevention device exhibits a resistance that is at least twenty times greater than a resistance of the sensing device.

38. The method of claim 33, wherein the first resonant network includes a capacitor and an inductor that are electrically connected in series, the first resonant network being connected to an output of the DC-AC inverter.

39. The method of claim 33, wherein the second resonant network includes an inductor, a capacitor and a damping device, the inductor, the capacitor and the damping device being electrically connected to an output of the bridge circuit and to the bypass device.

40. A method for driving a discharge lamp that is electrically connected to a lamp driving output of a tank circuit, the tank circuit having a first resonant network and a second resonant network, in which a voltage is input to the tank circuit, the second resonant network having at least one damping resistor in series with at least one resonant capacitor, and in which a DC-AC inverter, having a sensor, a bypass device, and a bridge circuit is electrically connected to the input voltage and to the tank circuit, the method comprising:

operating the tank circuit such that the second resonant network delivers an alternating ignition voltage to the lamp during a startup operation mode;

operating the tank circuit, after a lapse of a predetermined time period, such that the first resonant network delivers an alternating rectangular current to the lamp during a normal operation mode;

sensing a current flow in the first resonant network with the sensor; and decoupling a current flow in the first resonant network from the current flow in the second resonant network with the bypass device of the DC-AC inverter.

* * * * *

UNITED STATES PATENT AND TRADEMARK OFFICE
CERTIFICATE OF CORRECTION

| | |
|---|---|
| PATENT NO. | : 6,448,720 B1 |
| DATED | : September 10, 2002 |
| INVENTOR(S) | : Y. Sun |

It is certified that error appears in the above-identified patent and that said Letters Patent is hereby corrected as shown below:

<u>Column 11,</u>
Line 60, before "tank" insert -- a --.

Signed and Sealed this

First Day of July, 2003

JAMES E. ROGAN
*Director of the United States Patent and Trademark Office*